(12) United States Patent
Carlson et al.

(10) Patent No.: US 6,901,220 B1
(45) Date of Patent: May 31, 2005

(54) SUPRACONNECT LASER COMMUNICATION SYSTEM

(75) Inventors: Robert T. Carlson, Downington, PA (US); Jesse W. Booker, Schwenksville, PA (US); Alvin Cabato, Plymouth Meeting, PA (US); David Driscoll, West Chester, PA (US)

(73) Assignee: LSA, Inc., Arlington, VA (US)

( * ) Notice: Subject to any disclaimer, the term of this patent is extended or adjusted under 35 U.S.C. 154(b) by 717 days.

(21) Appl. No.: 09/708,469

(22) Filed: Nov. 9, 2000

(Under 37 CFR 1.47)

Related U.S. Application Data
(60) Provisional application No. 60/164,335, filed on Nov. 9, 1999, and provisional application No. 60/164,336, filed on Nov. 9, 1999.

(51) Int. Cl.[7] .............................................. H04B 10/24
(52) U.S. Cl. ..................... 398/118; 398/121; 398/130
(58) Field of Search ............................... 398/118, 121, 398/130; 342/53, 54; 370/277, 310–350, 913

(56) References Cited

U.S. PATENT DOCUMENTS

| | | | | |
|---|---|---|---|---|
| 5,347,387 A | * | 9/1994 | Rice | 359/152 |
| 5,552,920 A | * | 9/1996 | Glynn | 359/172 |
| 6,285,476 B1 | * | 9/2001 | Carlson et al. | 359/159 |

* cited by examiner

Primary Examiner—Jason Chan
Assistant Examiner—David C. Payne
(74) Attorney, Agent, or Firm—Reed Smith LLP; Stanley P. Fischer, Esq.; Juan Carlos A. Marquez, Esq.

(57) ABSTRACT

A wireless atmospheric site-to-site full-duplex (i.e., simultaneous transmit and receive) laser communication system, typically for wideband (high-speed) data, voice, and/or video transmission. The system includes at least one laser communication transceiver each having an electro-optical transmitter that includes a laser source for generating laser light to be transmitted site-to-site and at high speed, an electro-optical receiver that includes a baffle assembly for receiving light directly onto a detector, without an intermediate field stop and re-imaging relay optics to reject off-axis light sources. Wideband data are transmitted and received through the atmosphere by the electro-optical transmitter and the electro-optical receiver. The data to be transmitted through each laser communication transceiver is inputted through a fiber-optic receiver and outputted by a fiber-optic transmitter. Outgoing laser light is generated by the laser source after it is triggered by an inputted signal from the fiber-optic receiver.

47 Claims, 10 Drawing Sheets

SUPRACONNECT LASER COMMUNICATION SYSTEM

BACKGROUND OF THE INVENTION

This application claims the benefit of U.S. Provisional Patent Applications Ser. Nos. 60/164,335 and 60/164,336 filed on Nov. 9, 1999, the entire disclosures of which are incorporated herein by reference.

1. Field of the Invention

The present invention relates to the field of site-to-site atmospheric windband optical communication systems. In particular, the present invention relates to a full-duplex (i.e., simultaneous transmit and receive) laser communication system for point-to-point communications through the atmosphere.

Wideband (high-speed) data transfer at rates in excess of 1.5 Mbps may be relatively expensive for dedicated bandwidth (e.g., leased lines) transmission over the existing telecommunications infrastructure. Over modest ranges where an unobstructed line-of-sight exists a laser communication link may provide an alternative means for obtaining dedicated bandwidth transmission at high data rates.

2. Description of the Prior Art

Microwave line-of-sight systems are known in the art. However, the majority of such systems on the market are not capable of the desired data rates in excess of 1.5 Mbps (e.g., 10, 45, and 155 Mbps). Microwave systems also require FCC licensing, and are susceptible to terrain and building reflections, typically requiring tall towers which add significantly to the expense.

SUMMARY OF THE INVENTION

The present invention cost-effectively realizes a wireless atmospheric laser communication system, typically for use over ranges of 0.3–10 km, for high-speed data, voice, and/or video transmission at rates in excess of 1.5 Mbps. The interfaces to the laser communication system are based on computer and telecommunications standards, such as those employed in computer networks or telecom transmission equipment.

The system of the present invention enables the full-duplex (i.e., simultaneous transmit and receive) line-of-sight transmission of high-speed data, as well as voice, video, graphics, and images. Data is generally transmitted in binary digital form, but may also be transmitted as an analog waveform; for example, multiple NTSC television signals with video and stereo sound as a pulse frequency modulated waveform.

Communication links are established on a point-to-point basis and may be aggregated to form a network interconnecting many nodes, for example in a star or hub topology, or may be used to realize a communications relay function.

The approach of the present invention emphasizes a cost-effective implementation for a wideband laser communication system suitable for link ranges up to 10 km. Each laser communication link is line-of-sight and point-to-point between a pair of terminals, and may be integrated into a network of multiple links, as well as interfaced with other communications networks.

There are three primary advantages to the system of the present invention:

1. Ability to mass produce: Because of the design and system implementation described in the preferred embodiment (e.g., cast aluminum housing, 'soda straw' receiver baffle, transmitter and receiver tubes fastened to a common bulkhead, with drop-in tolerances for the optical components, etc.), the SupraConnect laser communication terminals are amenable to volume production.

2. Cost: By eliminating costly manufacturing processes (e.g., labor intensive assembly), and by minimizing alignment requirements (e.g., drop-in optics) and employing rapid interferometric and boresight alignment techniques, the SupraConnect design is amenable to significantly lower manufacturing costs in volume production than other systems currently on the market.

3. Performance and reliability: The overall design of the SupraConnect is very rugged and robust. For example, window heating and laser thermal control is more effective and better suited to continuous extended use in extreme environmental conditions than other designs. The design also utilizes a larger collecting aperture and has more link margin than other systems on the market. This enables the SupraConnect to be used in more demanding applications where ruggedness and reliability are important.

The system comprises a laser source for generating laser light to be transmitted site-to-site and at high speed, a fiber-optic transceiver, an electro-optical transceiver and at least one of: (a) a baffle assembly for receiving light directly onto the second transceiver, without an intermediate field stop and re-imaging relay optics to reject off-axis light sources, (b) thermoelectric cooler means for actively cooling the laser diode means. While wideband data are received through the atmosphere by the electro-optical transceiver and outputted by the fiber-optic transceiver the user's equipment when the system is receiving data, a laser light is generated by the laser source after it is triggered by an inputted signal from the fiber-optic transceiver when the system is transmitting data. The system is further optimized by combining a transparent resistive coating, a thermoelectric cooler, an autoranging system with electronic translation, and a steering means yielding a system that to performs within the intended speed and range and in the intended harsh environment.

DETAILED DESCRIPTION OF THE INVENTION

Figure 1:
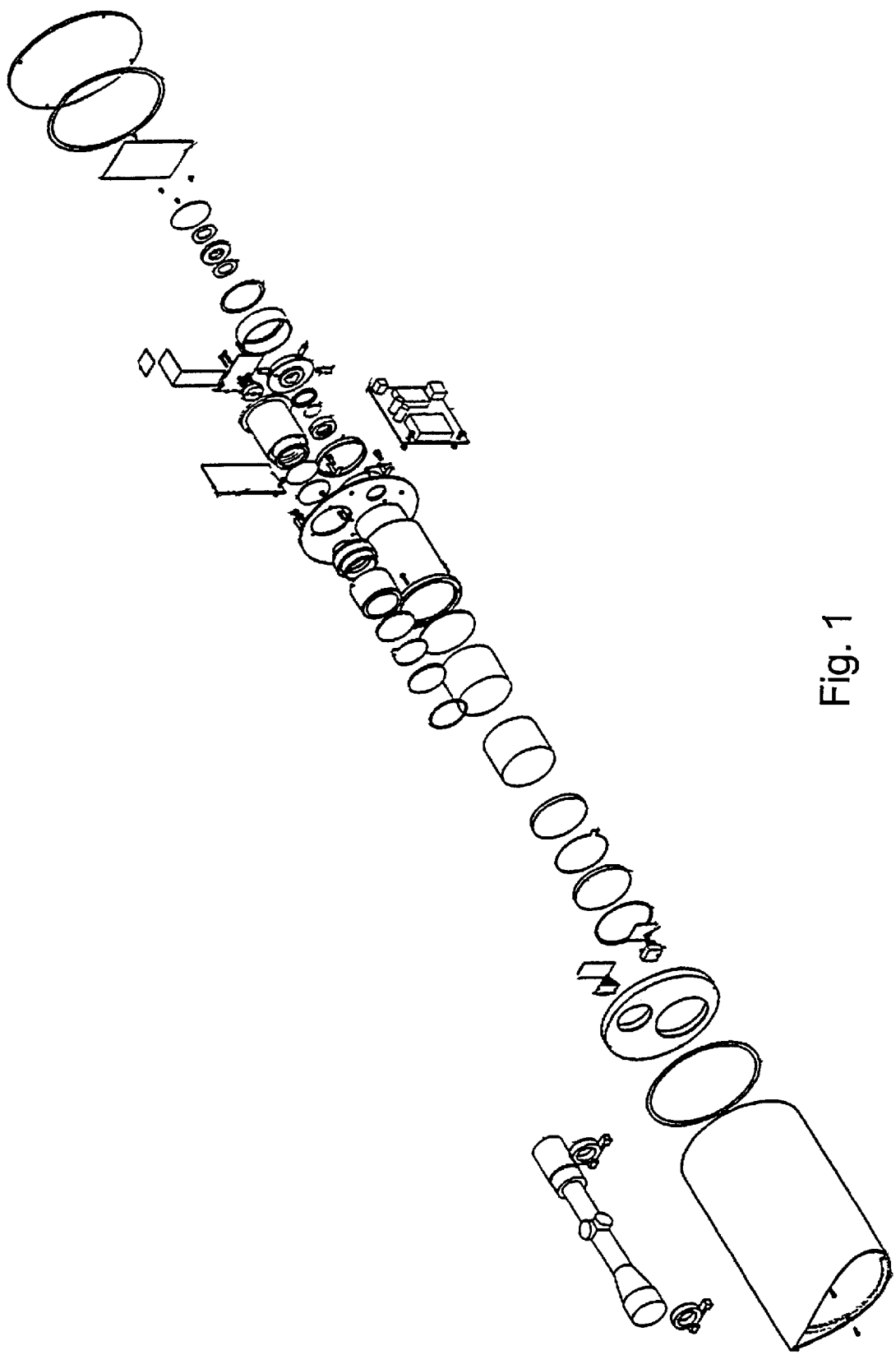
FIG. 1 is an exploded view of one embodiment of the present invention.
Figure 2:
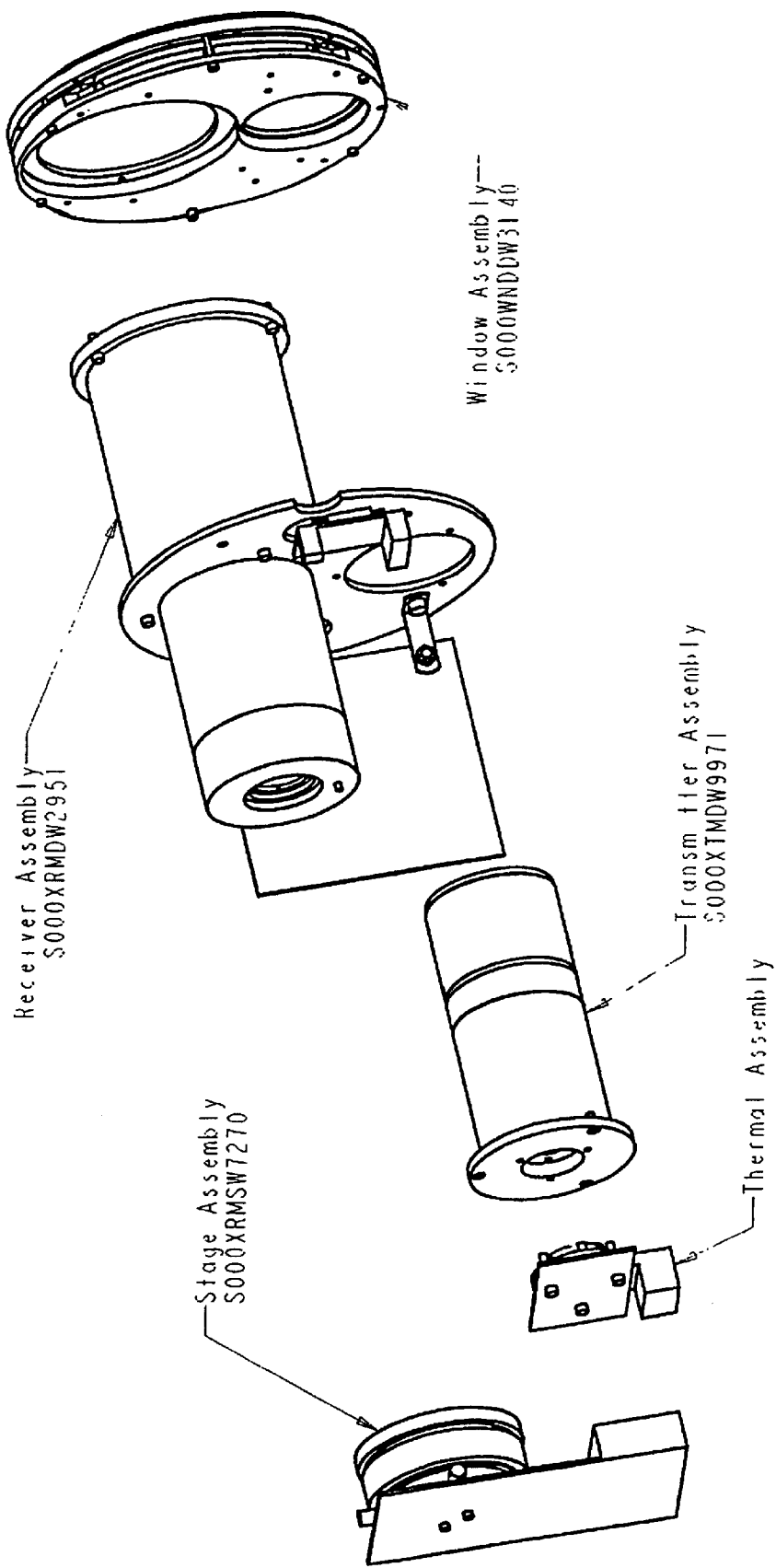
FIG. 2 is a diagram illustrating the major subsystems of the embodiment the present invention shown in FIG. 1.
Figure 3:
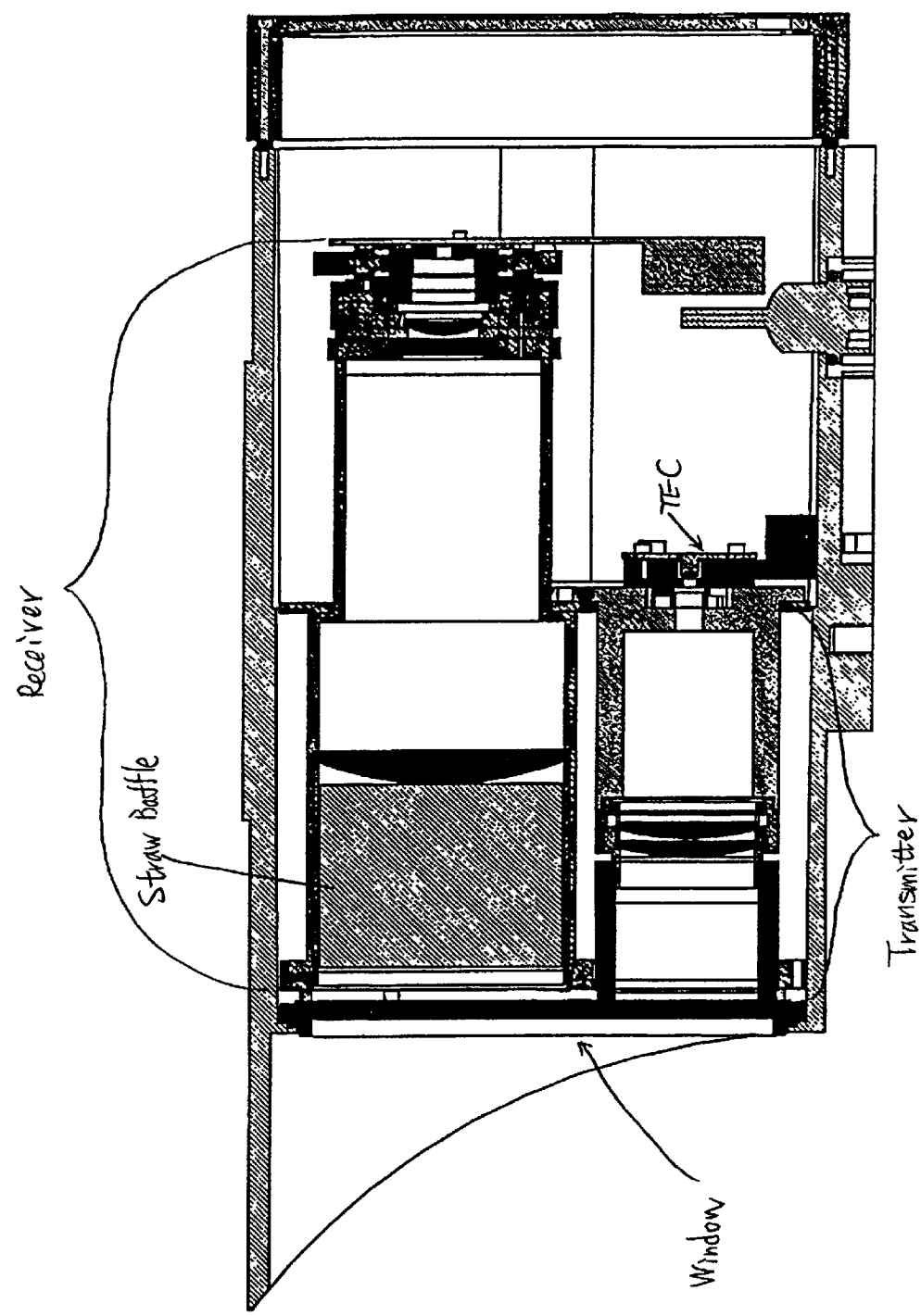
FIG. 3 is a sectional view of the embodiment the present invention shown in FIG. 1 with all the components are assembled.

The preferred embodiment of the SupraConnect laser communication system comprises separate internal optical systems for the transmitter 150 and receiver 101, packaged in a single cylindrical cast aluminum housing 600 with raised ribs, with a factory-mounted and bore-sighted sighting system 601. FIG. 1 is an exploded view of one embodiment of the laser transceiver of the present invention. The present invention was designed to give the most transmission range for the least amount of optical power, namely high-speed transmission in excess of 1.5 Mbps and maximum range to 10 km, and to achieve low cost manufacturing, telecom reliability during severe weather. In particular, the system was optimized by combining the subsystems as shown in FIGS. 2 and 3: a baffle 10 embedded in the receiver 101, a window assembly 200, a thermoelectric cooler 300, an autoranging system with electronic translation, and a steering means yield the whole system to perform within the intended speed and range in the intended harsh environment. The major environmental issues include scintillation (the mirage effect), visibility penetration through an enhanced system dynamic range (utilizing every last drop of optical power), wind and vibration stability (improved by the steering means), window obscuration from dew and snow (resolved by the transparent coating), and telecom reliability (improved by the thermoelectric cooling of the laser diode).

The SupraConnect laser transceiver is packaged in a distinctive aluminum casting 600, suitable for cost-effective high volume production, which is essentially cylindrical in shape and includes an integral cast hood 603 as a distinctive feature to shield the window from rain and snow, an integral cast mount 604 for a sighting system, and an integral cast heat sink 605.

The internal cylindrical housing 606 for the transmitter assembly 150 is entirely closed, such that any transmitter energy is prevented from scattering into the receiver 101. The transmitter output aperture 608 is 1"–3" (nominally 2") for reasons of laser eyesafety considerations. The receiver collecting aperture 609 is 2"–4" (nominally 3") for maximum light collection and aperture-averaging of atmospheric scintillation.

The nominal 2" transmitter optics and nominal 3" receiver optics 610 are housed in separate cylinders, which are captured in fore and aft bulkhead disks 611 (nominally 6" in diameter) which permit this composite transceiver assembly (FIG. 2) to slide into the cylindrical castling 600, as a single unit. The transmit and receive channels are typically operated at the same 785 nm wavelength, where lasers of moderate power are available at reasonable cost. This is possible since the transmit and receive channels are physically separate, and the single transmit/receive wavelength has the advantage of any terminal being, able to communicate with any other terminal.

The separate transmit and receive apertures are sealed against moisture and the outside environment with a single piano window 200, nominally 6" in diameter, having no optical power. The exterior window surface has a dichroic optical coating which has a distinctive mirror-like appearance which is highly reflective (e.g., 99%) for visible light, but highly transmissive (e.g., 95%) for the near-infrared laser radiation. This exterior window coating reflects nearly all the solar energy in the visible region which otherwise would be trapped and cause heating of the telescope interior, as well as degraded receiver sensitivity.

The window is sealed, shock-mounted, and thermally isolated from the SupraConnect housing by an elastomeric gasket 612 around its circumference. The interior surface of the window employs an electrically conductive coating (e.g., indium tin oxide) which provides a resistive heating function 200 to prevent condensation, frost, and icing of the transmit/receive window. This implementation of an optically transparent heater across the entire surface area of the window ensures uniform heating with modest power requirements, compared to less efficient or less uniform heating methods like a heated window mount, an internal heater, or a heated telescope housing.

The use of this thin-film heater coating permits superior optical wavefront quality, compared to heater wires or a heater element laminated between (or bonded to) optical substrate(s). The window heater 210 is thermostatically controlled, and the electrically conductive coating is index-matched to air at the operational laser transmit and receive wavelengths to ensure low optical losses.

The refractive receiver optics 610, nominally 3", provide a larger collecting aperture than other designs (e.g., 3 dB link benefit over a 2" receiver). Larger apertures are readily available as fresnel lenses, but these optics have significant scatter and a large blur size which adversely impacts detector size, cost, and bandwidth. In addition, fresnel lenses lack the thermo-mechanical stability required for long-life and system operation under extreme environmental conditions (e.g., desert summers and sub-zero winters).

For these reasons, the preferred embodiment for the SupraConnect design employs a 3" refractive lens 610 for the receiver collecting aperture (rather than a fresnel optic), followed by a smaller lens 613 with more optical power near the detector 110 to achieve a fast optical system (e.g., f/1.2). This approach is generally superior to a fire-polished molded glass asphere, which tends to have poorly controlled surface figure and focal length and a spot size which is very unforgiving of receiver pointing error.

The fast optical design of the preferred embodiment permits the length of the receiver 101 to be kept short for compactness (circa 5"), and also permits the use of a small detector 110 (e.g., 0.5 mm) with a narrow field of view (e.g., 6 mrad) to help reject off-axis light sources. A 785 nm narrowband optical filter 614, with short and long wavelength blocking, is used to reject out-of-band background light, and is located just before the smaller lens 613 to minimize the filter size and cost. The filter passband is designed to accommodate the laser center-wavelength manufacturing tolerance and passband shift due to the angle-of-incidence variation represented by the converging cone of energy.

The transmitter 150 (typically 2") comprises of a pair of refractive lenses 607, either glass or optical grade plastic, with anti-reflection coatings for the near-infrared laser wavelengths of interest (e.g., 770–870 nm, or 1480–1580 nm). The use of a pair of commercially available lenses 607 with spherical curvature results in a cost-effective implementation to reduce the laser beam divergence to the desired value with controlled aberrations. These lenses 607 are operated at about f/2, which sacrifices some energy from the laser diode fast axis 155. but provides a more uniform illumination at the aperture for greater eyesafety, and reduced ellipticity of the output beam divergence ratio. The resulting transmit beam has a beam divergence ratio of about 2:1, horizontal versus vertical. The transmitter housing 606 is designed for quick factory adjustment of the beam divergence (e.g., 1–20 mrad) by defocusing the lens assembly from the collimated position by means of turning a threaded sleeve 615 in or out, which is then locked in position (e.g., with set screws).

Figure 4:
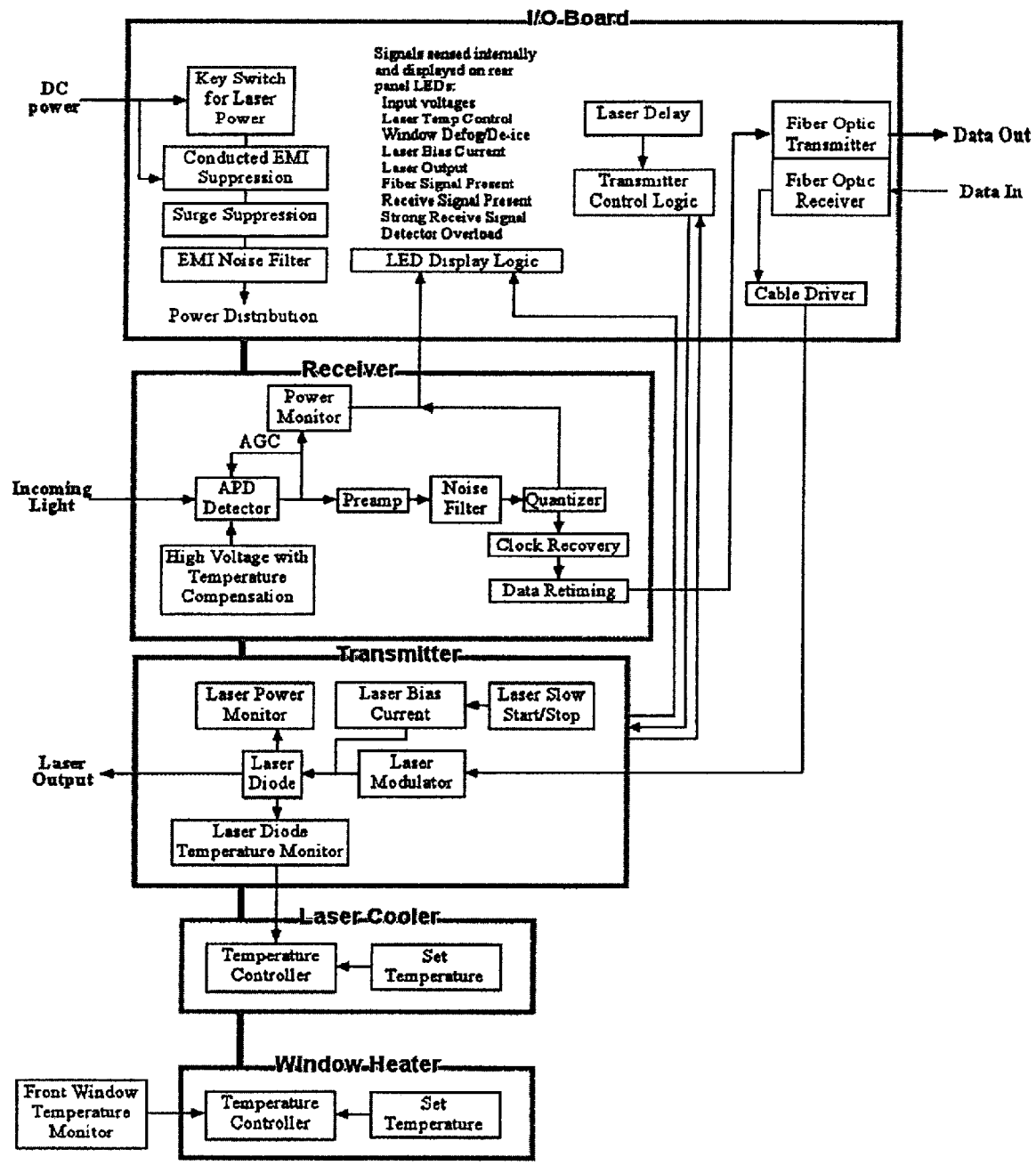
FIG. 4 is a block diagram of the five main electronic circuits of the embodiment the present invention shown in FIG. 1.

The system also requires the electronic circuits to drive higher currents at fast switching rates. Therefore, electronics were custom-designed for the transmitter 150A, the receiver 101A, a thermoelectric cooler 300A, a window heater 200A, and the input/output board 700A as shown in FIG. 4, since they are not commercially available, to achieve proper optical signal modulation.

The wideband, high-current transmitter electronics 150A include slow-start and transient surge protection features for enhanced laser 155 lifetime. The laser assembly 302 is thermally isolated and actively cooled (or heated) with the thermoelectric cooler 300 (TEC) and a proportional-integral-differential temperature controller 310. This assembly 302 is directly coupled, via a copper bracket 616 to the massive aluminum casting 600 for optimal heat transfer. The transmitter circuitry 150A is not activated until the laser 155 has been cooled (or heated) to the operating setpoint temperature 311. This thermal design offers superior laser lifetime in thermally stressing environments such as desert operation. The long transmission of 0.3–10 km at above 1.5 Mbps requires a significantly high laser output power. And the resulted high electrical current increases the heat generated around the laser diode 155, preferably the Circulaser Diode PS026-00 (780 nm; 50 mW; GaAlAs) made by Blue Sky Research at 3047 Orchard Parkway, San Jose, Calif. 95134 http://www.blueskyresearch.com/html/product_set.html, or SDL 5420 made by Spectra Diode Labs operated at 200 mW peak power. The increased heat of the lasers increases the junction temperature of the laser diode and drastically decreases the lifetime of the laser diode. In order to achieve high reliability, the heat must be extracted from the laser diode. This was accomplished by custom fitting the thermoelectric cooler 300 to the system.

The thermoelectrically cooled laser assembly 302 and drive electronics 300A are provided for laser and system longevity, with a heat pipe 616 as the preferred embodiment for efficient thermal transfer from the laser assembly 302 to a large-capacity thermoelectric cooler 300 mounted to a massive heat sink 600 (e.g., the casting itself). The transmitter electronics board 150A utilizes a ground plane, and is shielded on the remaining 5 sides by a metal cover to suppress radiated EMI from the wideband high-current pulses which would otherwise impair the receiver electronics 101A.

The receiver 101 uses an avalanche photodiode 110 (APD) for optimum sensitivity, where the APD 110, its gain control, and the preamplifier 115 and quantizer integrated circuits 125 have been selected for their combination of characteristics such that, when integrated together, they provide optimal receiver sensitivity and dynamic range. A hybrid receiver designed in-house with a GaAs FET transimpedance preampliflier 115 allows the receiver to achieve a premium sensitivity of 50 nW for 155 Mbaud with background light, which enable the system to outperform other existing systems by a factor of 4. The Anadigics preampliflier 115 sensitivity for 120 MHz BW and ¾ 10-9 BER with a 0.5 pf PIN detector is −37 dBm. The usable dynamic range for the signal is limited by the APD 110 specs to 1.5 $\mu$W. When the received light spot size is blurred to 320 $\mu$m at the APD 110, the receiver electronics 101A can tolerate a laser signal strength 6 as large as 15 $\mu$W (15 $\mu$W vs. 20 nW=50 dB dynamic range). The preamplifier 115 output is lowpass filtered 120 and ac-coupled into the quantizer 125, which is input to a clock recovery 126 and data retiming device 127. The phase-locked-loop characteristics of said device 127 are optimized for use in a fading atmospheric channel 630. The receiver circuitry 101A employs differential inputs and outputs for common-mode noise rejection and reduction of EMI emissions. The differential retimed data is input to a fiber-optic transmitter 715, providing a fiber output interface 3 to the user equipment or an intermediate media converter. Similarly, the user input 4 to the laser modulator 160 is via fiber to the fiber-optic receiver 720.

The interfaces 3 and 4 to the laser communication system are based on conventional computer and telecommunications standards, such as those employed in computer networks or telecom transmission equipment. Data is generally transmitted in binary digital form, but may also be transmitted as an analog waveform; for example, multiple NTSC television signals with video and stereo sound as a pulse frequency modulated waveform. Communication links are established on a point-to-point basis and may be aggregated to form a network interconnecting many nodes, for example in a star or hub topology, or may be used to realize a communications relay function.

Baffle Assembly

A novel and distinguishing feature of the invention is the use of a unique 'soda straw' light baffle for the receiver, nominally 3" in diameter and 3" in length for a 3" receiver, which resembles a bundle of soda straws or a honeycomb, typically with a flat black coating. The baffle component is available from Tenebraex, 362 A Street, Boston, Mass. 02210, http://www.camouflage.com, and is commonly used to minimize reflections and glare from night vision systems. To the applicants' knowledge, it is the first use of the baffles in a laser communication system to provide a means to limit the field of view of the receiver to minimize the effects of a setting or rising sun or moon. Other laser communication systems 1) use a more conventional optical means which increases the cost with additional optics and mechanics; 2) do not use a field stop at all, which does not provide a robust communication link in the environment; or 3) reduces the size of the detector to limit the field of view, which makes the system more susceptible to building and wind vibration.

The individual subapertures are typically ⅛"–⅜" in dimension with a length-to-diameter aspect ratio>6:1 (typically 12:1) to block (i.e., absorb and diffusely scatter) light rays from the sun or background-light sources a couple degrees or more off-axis and prevent them from being imaged onto the receiver detector plane. This light baffle may be implemented in a number of ways (e.g., with subapertures which are circular, square, or hexagonal) and in a variety of materials (e.g., plastic or aluminum), either as an ensemble of discrete subapertures (e.g., plastic straws or metal tubing), an extruded monolithic assembly, or a set of two or more disks with aligned subapertures (i.e., disks with an array of holes).

Figure 5A:
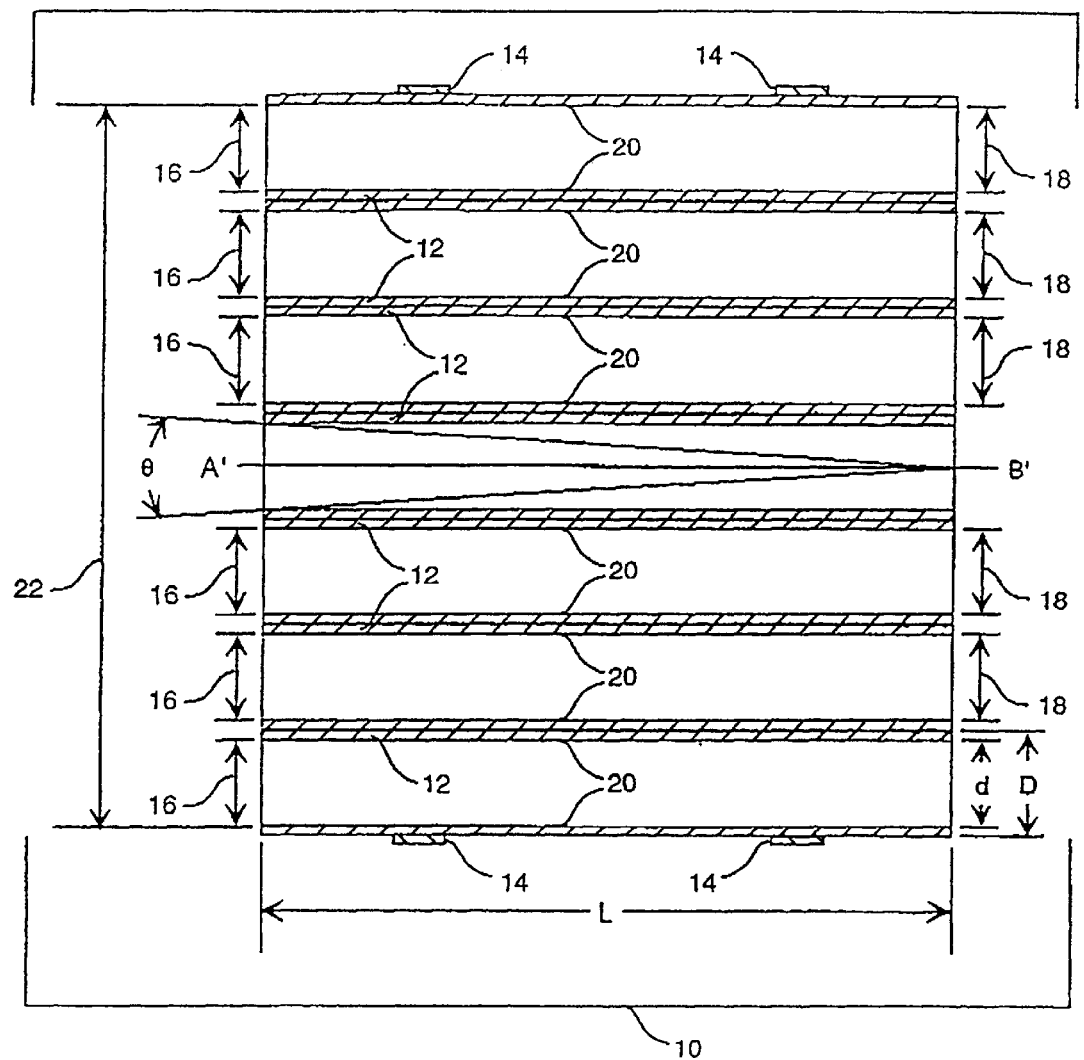
FIG. 5A is a cross sectional view of the preferred embodiment of the invention.
Figure 5B:
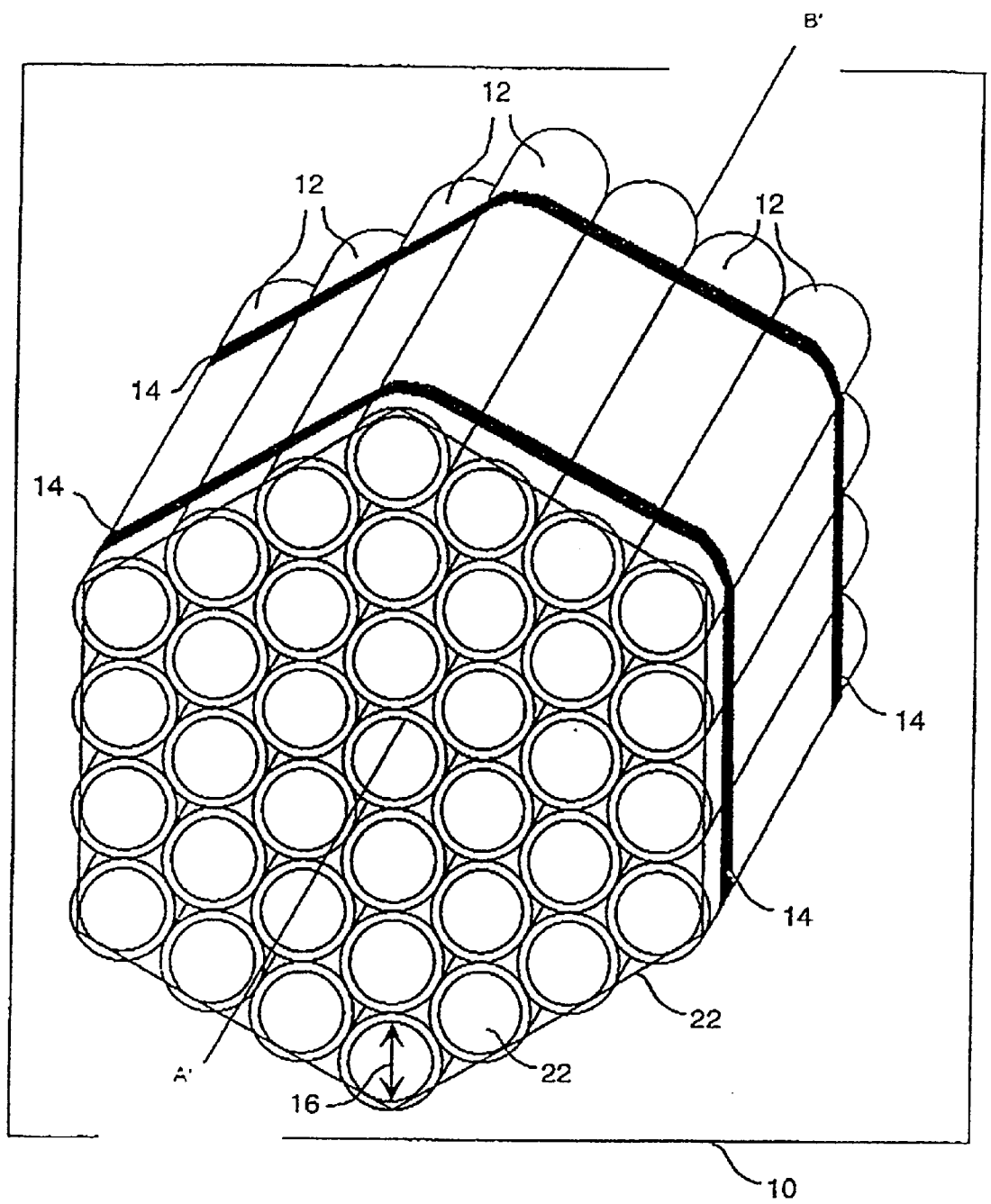
FIG. 5B is a perspective view of the preferred embodiment shown in FIG. 5A.

Referring to FIGS. 5A and 5B, there is shown, in simplified form and in two views, the preferred embodiment of the baffle assembly 10 which consists of an array of hollow cylinders 12 held by a sleeve 14 in accordance with the invention.

As a matter of preference, and not of limitation, the entrance aperture 16 and exit aperture 18 of the hollow cylinders 12 are equal in size such that the cross sectional area of the cylinder is constant. The inner diameter, d, of each hollow cylinder 12, corresponds to the diameter of the smallest aperture of the baffle assembly. Also, as a matter of preference, the lengths of the hollow cylinders 12 are the same. The field of view, θ, of the baffle assembly is equal to the inner diameter, d, of each hollow cylinder 12 divided by the length, L, of the baffle assembly 10. The inner surface 20 of the hollow cylinders 12 is diffuse so as to absorb off-axis radiation entering the baffle assembly 10 at an angle exceeding its field of view θ.

The number of hollow cylinders 12 in the baffle assembly 10 depends on the outer diameter, D, of the hollow cylinders 12, the cross sectional geometry of the hollow cylinders 12, and the cross sectional geometry of the baffle assembly 10, as defined by the system entrance aperture 22. The array fill factor is the ratio of the transparent cross sectional area within the system entrance aperture 22 to its cross sectional area. The cross sectional geometry, inner and outer diameters, and length of the hollow cylinders is optimized to maximize the array fill factor while satisfying a predetermined field of view.

Figure 6A:
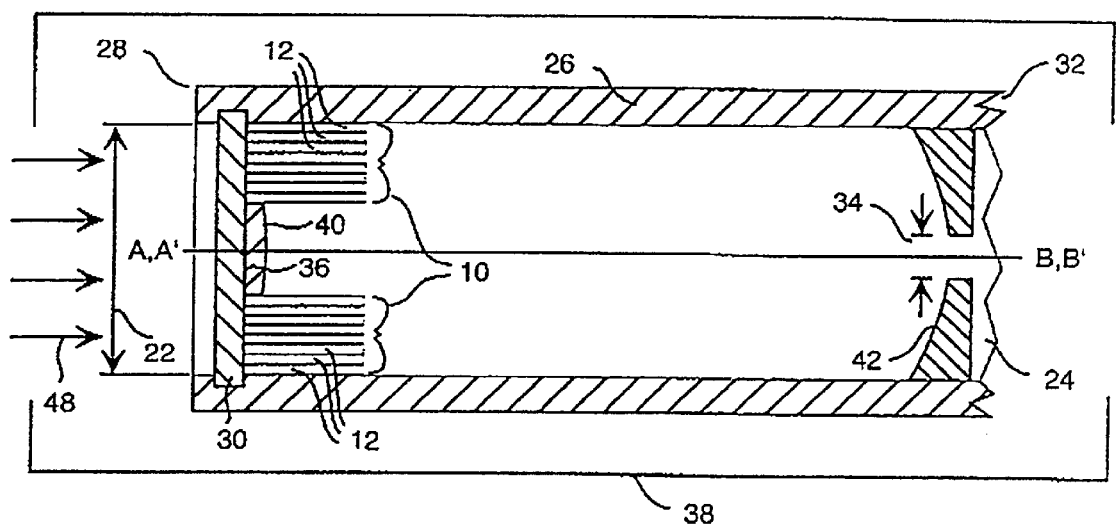
FIG. 6A is a cross sectional view of an optical transceiver employing the preferred embodiment of the invention shown in FIG. 5A.
Figure 6B:
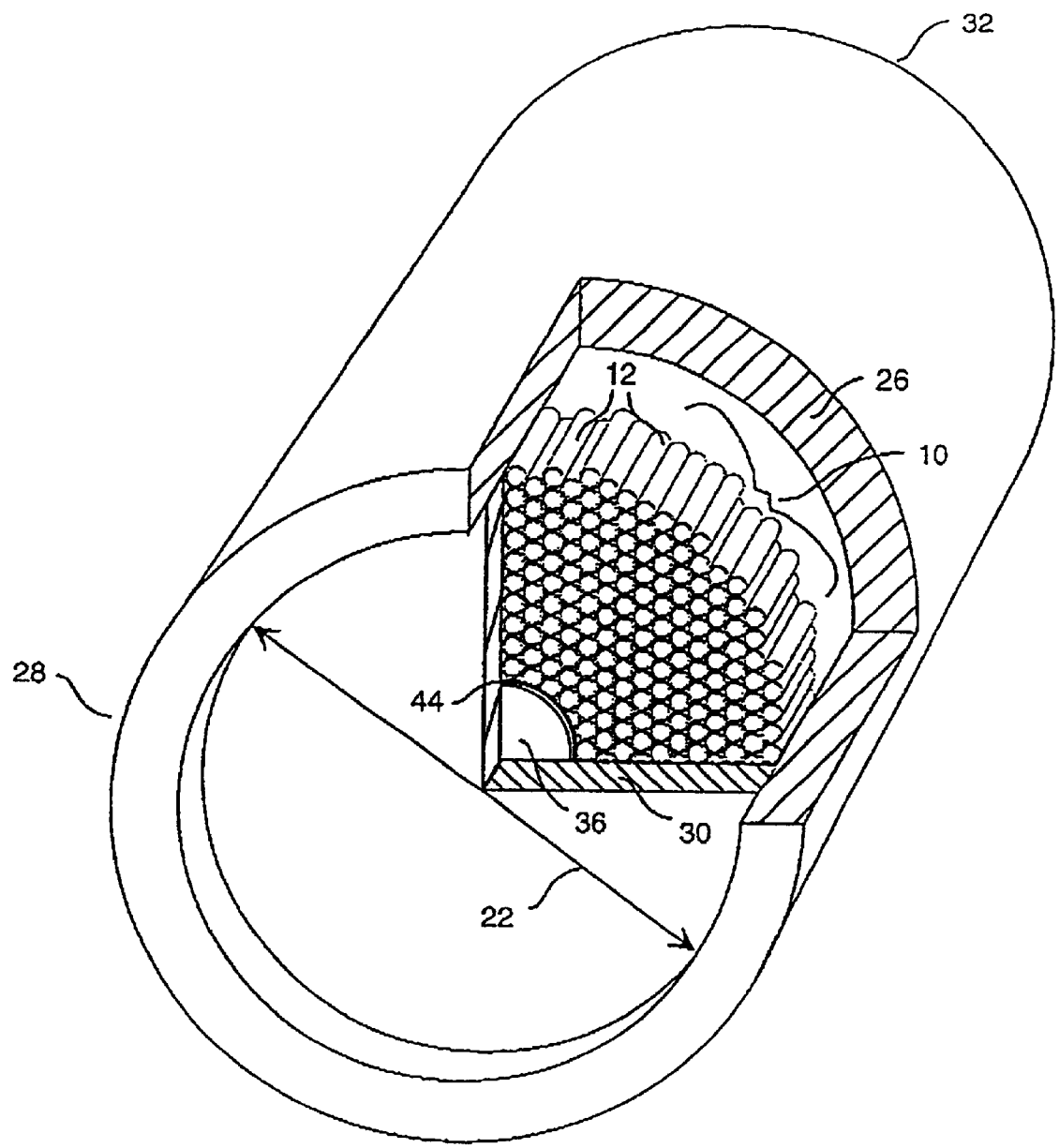
FIG. 6B is a perspective view, partially fragmented and in simplified pictorial form, of the optical transceiver shown in FIG. 6A.

Referring now to FIGS. 6A and 6B, there is shown, in simplified form and in two views, the application of the preferred embodiment 10 of the present invention, as adapted for use with the associated optical system 24. The optical system 24 has an optical axis A-B, and compromises: a hollow housing 26, front end 28 which supports a window 30 with a clear aperture that defines the system entrance aperture 22, back end 32 with a system exit aperture 34, with these apertures centered on the optical axis A-B, and with these apertures 22 and 34 sized and shaped to accommodate the field of view of the optical system 24. The longitudinal axis A'-B' of the baffle assembly 10 is coincident with the optical axis of the optical system 24.

As a matter of preference, and not of limitation, to demonstrate the scalability and adaptability of the unique baffle assembly 10 to a telescope assembly 38 with a central obscuration 36, the system entrance aperture 22 is obscured by the secondary mirror 40 at the front end 28, and the system exit aperture 34 at the back end 32 is sized and shaped in the secondary mirror 40 to accommodate the field of view of the optical system 24. The corresponding baffle assembly 10 for the optical system 24 comprises: an annular array of hollow cylinders 12 and an inner sleeve 44 whose inner radius is greater than or equal to the marginal ray height at the exit of the baffle assembly 10, at a distance L from the system entrance aperture 22, to prevent vignetting of the reflected receive beam 48 off the primary mirror 42.

The manner of operation and use of the preferred embodiment of the baffle assembly 10, as shown in FIGS. 5A and 5B, can be easily ascertained by any person of ordinary skill in the art from the foregoing description, coupled with reference to the Figures of the drawings. With reference to FIG. 5B, any ray of light whose entrance angle exceeds the field of view (of the baffle assembly 10, will be absorbed by the inner surface 20 of the hollow cylinder 12 after one or more reflections. Rejection of the skew rays of light is achieved with either a diffuse coating applied to the inner surface 20 of the hollow cylinder 12, constructing the hollow cylinders 12 from a diffuse material, or subsequently treating the extruded cylinder in a manner resulting in a diffuse surface. Rays parallel to the longitudinal axis of the baffle assembly 10 will exit the assembly through the exit aperture 18 to the accompanying optical system 24 as desired. Arrays of hollow cylinders can be easily constructed to operate with any system aperture cross sectional geometry, and likewise, there are no fundamental operational limitations on the cross sectional geometry of the individual hollow cylinders 12.

Multiple Planes of Arrayed Apertures

Figure 7A:
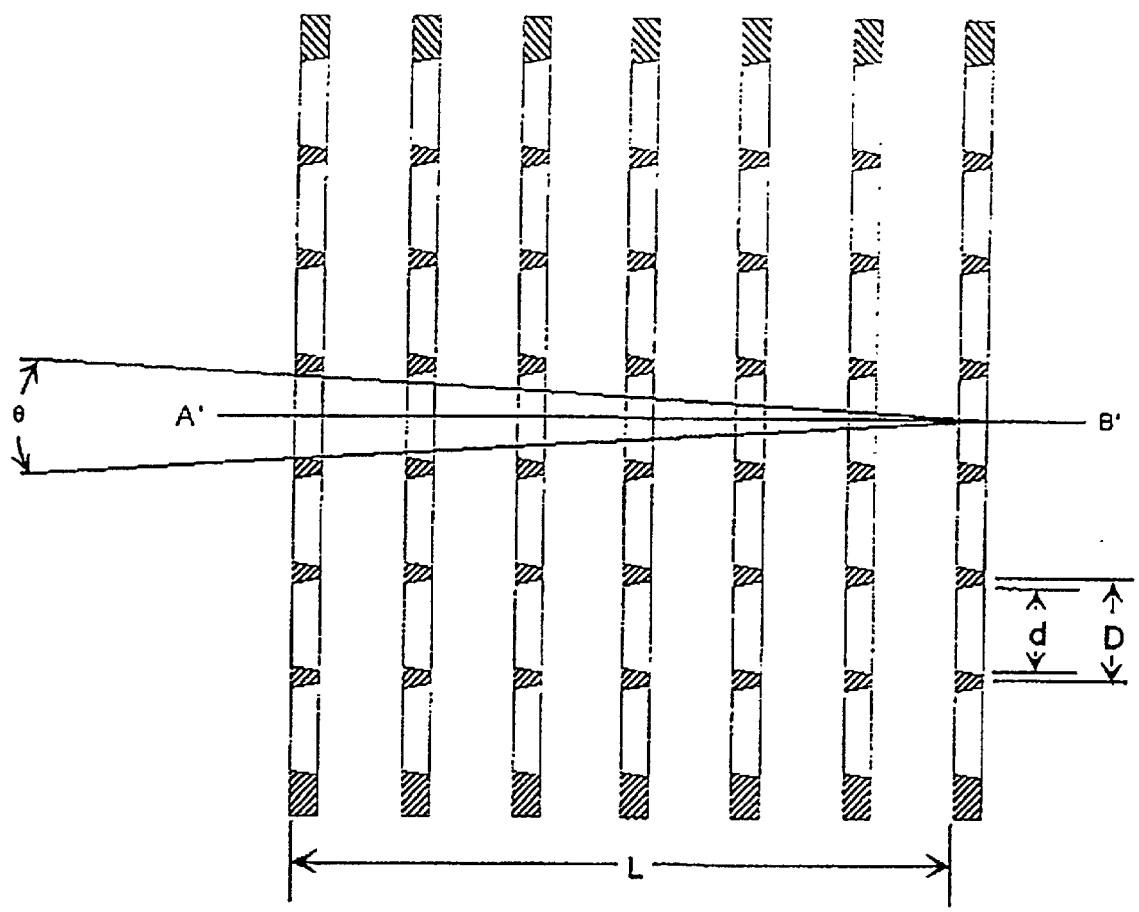
FIG. 7A shows a cross sectional view of an alternate embodiment of the baffle assembly.

Referring now to FIG. 7A, there is shown, in a simplified side view, an alternative embodiment of an arrayed aperture baffle 62 which consists of multiple planes 50 of arrayed apertures 52. As can be seen from FIG. 7B, the planes are perpendicular to the hollow housing 26, evenly spaced one behind the other, and oriented such that the centerline of a particular aperture on the first plane is collinear with respect to the centerlines of apertures at the same location of subsequent planes. The arrayed apertures 52 are optically transparent, and the front surface 54 and the back surface 56 of each of the planes 50 are diffuse to absorb off-axis rays whose entrance angle with respect to the longitudinal axis of the arrayed aperture baffle 62 exceeds the assembly's field of view, defined by the diameter of the arrayed apertures 52 divided by the distance from the front surface 54 of the first plane 58 and the back surface 56 of the last plane 60. The geometry, diameter, and center-to-center spacing of the apertures as well as the number of planes is optimized to maximize the array fill factor while satisfying a predetermined field of view.

As a matter of preference, and not of limitation, for manufacturing simplicity the arrayed apertures 52 are equal in size and each plane is identical in size and shape. Further, the edges of the arrayed apertures 52 are sharp (e.g., a knife edge) to minimize scattering.

Figure 7B:
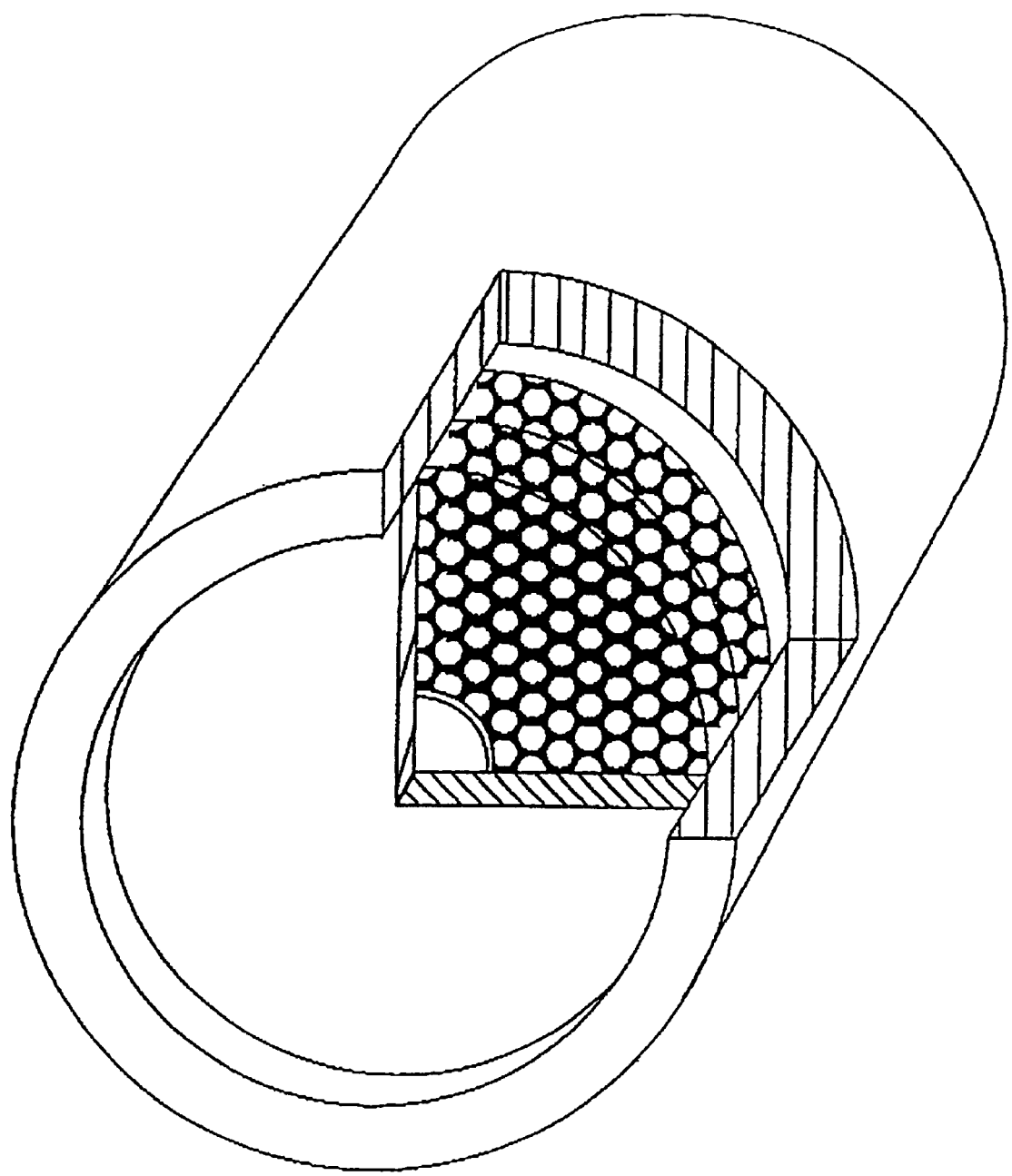
FIG. 7B is a perspective view, partially fragmented and in simplified pictorial form, of an optical transceiver employing the alternate embodiment of the invention shown in FIG. 7A.

With reference to FIGS. 7B and 6A, to demonstrate a modified arrayed aperture baffle assembly 64 to a telescope assembly 38 with a central obscuration 36, the system entrance aperture 22 is obscured by the secondary mirror 40 at the front end 28, and the system exit aperture 34 at the back end 32 is sized and shaped in the secondary mirror 40 to accommodate the field of view of the optical system 24. The modified arrayed aperture baffle assembly 64 consists of a series of planes of arrayed apertures, each with a larger central aperture 66 whose inner radius is greater than or equal to the marginal ray height at the exit of the baffle assembly 10, at a distance L from the system entrance aperture 22, to prevent vignetting of the reflected receive beam 48 off the primary mirror 42.

Multiple Planes of Arrayed Apertures-Operation

The manner of operation and use of the modified arrayed aperture baffle assembly 64, as shown in FIG. 7B, can be easily ascertained by any person of ordinary skill in the art from the foregoing description, coupled with reference to the Figures of the drawings.

With reference to FIG. 7A, any light whose entrance angle exceeds the field of view θ of the arrayed aperture baffle 62, will be absorbed by the front surface 54 and the back surface 56 of adjacent planes 50 after one or more reflections. Rejection of the skewed rays of light is achieved either by applying a diffuse coating to the front surface 54 and the back surface 56 of each of the planes 50, constructing the planes 50 from a diffuse material, or subsequently treating planes 50 of arrayed apertures 52 to yield a diffuse surface. Rays parallel to the longitudinal axis of the arrayed aperture baffle 62 will exit the assembly through the exit aperture 18 to the accompanying optical system 24 as desired. Planes of arrayed apertures can be easily constructed to operate with any system aperture cross sectional geometry, and likewise, there are no fundamental operational limitations on the cross sectional geometry of the individual apertures.

Accordingly, it can be seen that, according to the present invention described in the foregoing Detailed Description and illustrated in the accompanying Drawings, a baffle assembly has been provided that effectively baffles off-axis radiation while maintaining high throughput of on-axis radiation, permits further reduction in the associated field-of-view, eliminates direction-sensitive system orientations, and thereby increases the system performance and availability of associated optical systems such as an optical receiver for atmospheric laser communications. The baffle assembly is easy to manufacture, light-weight, easy to align, and scalable to any size receiving aperture, regardless of geometry, with or without a central obscuration.

Although the description above contains many specificities, these should not be construed as limiting the scope of the invention but as merely providing illustrations of some of the presently preferred embodiments of this invention. Various other embodiments and ramifications are possible within its scope.

For example, the cross sectional geometry of the hollow cylinders may be circular, square, hexagonal, or any other geometry which proves to be most effective considering volume manufacturability (e.g., extrusion or moulding), assembly, performance, and cost. As such, in the case of moulded assemblies, entire sheets of hollow cylinders or arrayed apertures may be manufactured and stamped, cored, or sawed to match the cross sectional geometry of the entrance aperture of the associated optical system, thereby eliminating individual cylinders and any sleeves, thereby reducing parts count, cost, and assembly.

Further, the simplicity and elegance of such an assembly lends itself to all system geometries beyond the conventional circular cross section, with or without an obscuration, described herein. Thus the scope of the invention should be determined by the appended claims and their legal equivalents, rather than by the examples given.

The unique light baffle approach when employed in a laser communication system results in superior system performance compared to designs that image the received light directly onto the detector, without an intermediate field stop and reimaging relay optics to reject off-axis light sources (e.g., the sun, window glints, or street lights).

In summary, the SupraConnect design incorporates the following features:

1) The distinctive cylindrical appearance of the cast aluminum housing with raised ribs which incorporates the following features integral to the casting: an integral hood for transmit/receive window protection, an integral sighting system-mount, and an integral cast heat sink;
2) The full-aperture window (nominally 6") with the cold-mirror coating and its mirrored appearance on the exterior window surface, and its thermal control and background-light reflecting functions described above;
3) The use of an electrically conductive film on the interior surface of the window as a resistive heater for defogging and deicing;
4) The 'soda straw' light baffle for the receiver, described in the preferred embodiment, as a cost-effective means of preventing sunlight and other off-axis and nearly-on-axis light sources from being imaged onto the detector, avoiding the added length and additional expense associated with an intermediate aperture stop and re-imaging optics for the detector;
5) The use of a thermoelectrically cooled laser assembly for laser and system longevity; and
6) The use of separate tubes for the laser and its transmitter optics with zoom adjust for beam divergence, and the detector and its receiver optics, where these tubes are jointly captured and fastened to a common bulkhead, permitting rapid, accurate assembly and alignment procedures.

Alternative embodiments of the invention may be realized using optical elements with somewhat different optical prescriptions and spacings.

For example, separate transmit and receive wavelengths (e.g., 810 nm and 850 nm) may be used instead of the same wavelength. Such an approach may be advantageous in certain network applications with multiple co-located terminals, since the receiver optical bandpass filter may reject the undesired wavelength(s). It also provides enhanced transmit/receive isolation under foggy conditions where backscattered transmit energy may degrade the receiver sensitivity.

Separate transmitter and receiver windows (e.g., 2" and 3" instead of a single 6" diameter window), may be used, with each window separately heated using a transparent heater of the type described in the preferred embodiment.

An anti-fog coating may be used on the window(s) to prevent condensation, in lieu of a transparent window heater, for climates where frost, blowing snow, and ice are not an issue.

Transmitter beam divergence adjustment may be achieved by defocus of the lens(es) with sliding or rotating tubes (i.e., "trombone action") rather than a threaded adjustment mechanism.

A single 1"–2" molded plastic asphere may be used, preferably with anti-reflection coatings, instead of the pair of lenses used to collect the laser energy and set the beam divergence. This alternative embodiment is a likely baseline change to the preferred embodiment described above.

A full-aperture (e.g., 3" diameter) receiver optical bandpass filter may be used in front of the receiver lens to realize a narrower filter passband than is possible behind the lens in a converging cone of rays. This realization could also employ a small diameter (e.g., 10 mm) short wavelength absorptive blocking filter (e.g., Schott RG715) near the detector. This alternative embodiment is likely when separate wavelengths are used for transmit and receive (e.g., 810 nm 850 nm), rather than a universal wavelength (e.g., 785 nm). Also feasible in this configuration is the use of a single f/0.6–f/1.5 aspheric receiver lens (e.g., 3" diameter plastic or glass asphere), since there is no longer a concern with placing the bandpass filter in this fast cone of light.

The addition of closed-loop tracking of the incoming laser energy from a laser communication terminal by means of a position-sensing detector (e.g., quadrant detector) and processing electronics unit which is affixed to the sighting scope eyepiece may be used for the purpose of controlling an internal 2-axis steering device (or an external gimbal, e.g., elevation-overazimuth) which deviates the output laser beam direction in accordance with the time-varying position-sensing detector error signal. The position sensor and electronics may also be incorporated internally, instead of attached to the sighting system, using a beamsplitter cube to sample a small portion of the received energy.

The use of forward error correction block codes with deep interleaving (prior to the transmitter electronics, and subsequent to the receiver electronics) may also be applied for correction of burst errors arising from atmospheric scintillation.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A site-to-site atmospheric laser communication system for full duplex wideband data transmission, comprising a laser communication transceiver having:

an electro-optical receiver for converting incoming laser light into first digital optical data;

a fiber-optic transmitter for converting the first-digital electronic data into first digital optical data and transmitting the first digital optical data to a computer network;

a fiber-optic receiver for receiving second digital optical data from a computer network and converting the digital optical data into second digital electronic data;

a static electro-optical transmitter having static laser diode means for converting the second digital electronic data to outgoing laser light to be transmitted site-to-site and at a high speed;

a window element having transparent resistive coating as means for controlling temperature of said window element by applying electrical current to said transparent resistive coating;

a static baffle assembly for receiving the incoming laser light directly onto the electro-optical receiver, without an intermediate field stop and re-imaging relay optics to reject off-axis light sources; and thermoelectric cooler means for actively cooling said laser diode means, wherein the incoming laser light contains wideband digital optical data received through the atmosphere by said electro-optical receiver, and said outgoing laser light containing wideband digital optical data is generated by said diode-means after being triggered by at least one inputted signal from said fiber-optic transmitter.

2. A laser communication system according to claim 1, wherein said wideband data are transmitted in the range of 0.3–10 km.

3. A laser communication system according to claim 1, wherein said wideband data are transmitted in excess of 1.5 Mbps.

4. A laser communication system according to claim 1, wherein said laser diode means generates laser light to be transmitted in the range of 0.3–10 km.

5. A laser communication system according to claim 1, wherein said laser diode means generates laser light to be transmitted in excess of 1.5 Mbps.

6. The laser communication system according to claim 1, wherein said transparent resistive coating is formed from indium tin oxide.

7. The laser communication system according to claim 1, wherein said means for controlling the temperature of said window means comprises electrical conductors attached at the periphery of said window element and in electrical contact with said transparent resistive coating.

8. The laser communication system according to claim 1, wherein said temperature controlling means further comprises a heater controller for selectively applying electrical current in response to a sensed variance in temperature of said window element.

9. The laser communication system according to claim 8, wherein said heater controller comprises means for applying a proportional-integral-differential control algorithm in selectively applying electrical current.

10. The laser communication system according to claim 1, wherein said window element further comprises an exterior surface coated with a cold mirror coating which reflects solar radiation while transmitting the laser light of its respective laser transmission source.

11. The laser communication system according to claim 1, wherein said laser diode means generates laser light at a power level of at least 50 milliwatts.

12. The laser communication system according to claim 1, wherein said laser diode means comprises a 50 milliwatt GaAlAs diode-laser.

13. The laser communication system according to claim 1, wherein said electro-optical receiver comprises an avalanche photodiode (APD) for improving sensitivity.

14. The laser communication system according to claim 1, wherein said electro-optical receiver comprises a preamplifier.

15. The laser communication system according to claim 14, wherein said preamplifier is a GaAs FET transimpedance preamplifier.

16. The laser communication system according to claim 1, wherein said electro-optical receiver comprises a quantizer.

17. The laser communication system according to claim 14, wherein the signals outputted from said preamplifier is lowpass filtered and ac-coupled into a quantizer.

18. The laser communication system according to claim 1, wherein said electro-optical receiver comprises an input to a clock recovery and data re-timing device.

19. The laser communication system according to claim 1, wherein said electro-optical receiver comprises a differential inputs and outputs device for reducing common-mode noise and EMI emissions.

20. A laser communication system according to claim 1 further comprising:

an auto-ranging system having a collimating lens in the optical axis of said electro-optical transmitter, and electronic translation means for moving said collimating lens longitudinally in said optical axis to adjust beam divergence, whereby beam divergence is adjusted electronically to achieve a desired range.

21. The laser communication system for data transmission according to claim 20, wherein said electronic translation means comprises a voice coil.

22. A laser communication system according to claim 1 further comprising:

a sighting scope for aiding in positioning said laser communication transceiver;

a closed-loop tracking system for tracking incoming laser energy, including a position-sensing detector associated with said sighting scope for generating a time-varying error signal; steering means for deviating the direction of said laser communication transceiver; control electronics for controlling said steering means in accordance with the time-varying position-sensing detector error signal, wherein-said tracking system is formed so as to maintain said laser communication transceiver in operation in the presence of unstable mounting or platform motion.

23. The laser communication system for data transmission according to claim 22, wherein said position-sensing detector comprises a quadrant detector.

24. The laser communication system for data transmission according to claim 22, wherein said position-sensing detector comprises a CCD detector.

25. A site-to-site atmospheric laser communication system for full duplex wideband data transmission, comprising a first and a second laser communication transceivers each having:

an electro-optical receiver for converting incoming laser light into first digital optical data;

a fiber-optic transmitter for converting the first digital electronic data into first digital optical data and transmitting the first digital optical data to a computer network;

a fiber-optic receiver for receiving second digital optical data from a computer network and converting the digital optical data into second digital electronic data;

a static electro-optical transmitter having static laser diode means for converting the second digital electronic data to outgoing laser light to be transmitted site-to-site and at a high speed;

a window element having transparent resistive coating as means for controlling temperature of said window element by applying electrical current to said transparent resistive coating; and a static baffle assembly for receiving the incoming laser light directly onto the electro-optical receiver, without an intermediate field stop and re-imaging relay optics to reject off-axis light sources;

wherein the incoming laser light contains wideband digital optical data received through the atmosphere by said-electro-optical receiver, and said outgoing laser light containing wideband digital optical data is generated by said diode means after being triggered by at least one inputted signal from said fiber-optic transmitter; and said baffle assembly has a longitudinal axis, and said electro-optical receiver has an entrance aperture, an exit aperture, an optical axis, and a field of view, said longitudinal axis of said baffle assembly and said optical axis of said electro-optical receiver are coincident.

26. A laser communication system according to claim 25, wherein said baffle assembly is operatively positioned to be in optical communication with said second transceiver, said baffle assembly includes a plurality of hollow cylinders each having a longitudinal axis, a predetermined length, and a predetermined inner diameter, wherein the longitudinal axis of each said hollow cylinder is parallel to an optical axis of the second transceiver, said hollow cylinders being formed in an array, wherein a first end of said array has a predetermined geometrical cross section defining the entrance aperture of the assembly, a second end of said array has a predetermined geometrical cross section defining the exit aperture of the assembly, said assembly entrance and exit apertures being centered on, and disposed perpendicular to, said second transceiver optical axis, and with said assembly apertures sized to accommodate said field of view of the electro-optical receiver of said second transceiver, wherein the assembly apertures of said hollow cylinders are formed to substantially reduce off-axis radiation with respect to the electro-optical receiver of said second transceiver.

27. A laser communication system according to claim 26, wherein the cylindrical cross section of each hollow cylinder is rotationally symmetric about its longitudinal axis.

28. A laser communication system according to claim 26, wherein each hollow cylinder of said plurality has a diffuse internal surface which absorbs solar radiation.

29. A laser communication system according to claim 26, wherein the cylindrical cross section of each hollow cylinder is a polygon with sides of equal length.

30. A laser communication system according to claim 26, wherein the perimeter of the cross section of the assembly is chosen to match the entrance aperture of the associated optical system.

31. A laser communication system according to claim 26, wherein the cylinders are arrayed in an annular arrangement to accommodate a central obscuration.

32. A laser communication system according to claim 25, wherein said baffle assembly includes a plurality of planes having an array of transparent apertures, wherein the said planes are perpendicular to the optical axis of the electro-optical receiver, the planes being placed one behind another at a predetermined spacing, and the orientation of the planes is such that centerlines of each aperture in one plane is collinear with centerlines of corresponding apertures of all other planes.

33. A laser communication system according to claim 32, wherein each said aperture is rotationally symmetric about its longitudinal axis.

34. A laser communication system according to claim 32, wherein edges of each said aperture are sharp to reduce scattering.

35. A laser communication system according to claim 32, wherein each surface of each said plane is diffuse and absorbs solar radiation.

36. A laser communication system according to claim 32, wherein each said aperture is a polygon with sides of equal length.

37. A laser communication system according to claim 32, wherein said apertures are arrayed in an annular arrangement to accommodate a central obscuration.

38. The laser communication system according to claim 1, further comprising a heat pipe for thermal transfer from said laser diode means to said thermoelectric cooler means.

39. The laser communication system according to claim 1, wherein said the thermoelectric cooler means is mounted to a housing of said electro-optical transmitter, wherein said housing is further formed as a heat sink so as to dissipate heat from said thermoelectric cooler means.

40. The laser communication system according to claim 1, wherein said laser communication transceiver further includes a proportional-integral-differential temperature controller for controlling said thermoelectric cooler means.

41. The laser communication system according to claim 1, wherein said electro-optical transmitter comprises transmitter electronics working in temperature relation with said thermoelectric cooler means.

42. The laser communication system according to claim 41, wherein said transmitter electronics are activated only after said diode means has been cooled or heated to a predetermined operating temperature.

43. The laser communication system according to claim 41, wherein said transmitter electronics comprise a slow-start device for prolonging the lifetime of said diode means.

44. The laser communication system according to claim 41, wherein said transmitter electronics comprise a transient surge protection device for prolonging the lifetime of said diode means.

45. A method of operating a site-to-site atmospheric laser communication system for wideband data transmission, comprising the steps of:

providing a first transceiver having a fiber-optic transmitter and a fiber-optic receiver, a second transceiver having an electro-optical transmitter and an electro-optical receiver, and a baffle assembly;

receiving light directly onto the second transceiver via said baffle assembly, without any intermediate field stop and re-imaging relay optics to reject off-axis light sources;

demodulating said corresponding electrical signal with said receiver electronics;

correcting burst errors arising from atmospheric scintillation with forward error correction block codes and deep interleaving both prior and subsequent to the demodulating step;

generating laser light with said laser transceiver at a power level to transmit wideband laser light site-to-site;

modulating transmitted laser light with said electro-optical transmitter in accordance with data to be transmitted; and detecting said transmitted modulated laser light and generating an electrical signal corresponding thereto, wherein wideband data are received through the atmosphere by said electro-optical receiver and wideband data being outputted by said fiber-optic transmitter, and said laser light is generated by said diode means after being triggered by at least one inputted signal from said fiber-optic transmitter.

46. A method of operating a site-to-site atmospheric laser communication system for wideband data transmission, comprising the steps of:

providing a first transceiver having a fiber-optic transmitter and a fiber-optic receiver, a second transceiver having an electro-optical transmitter and an electro-optical receiver, and thermoelectric cooler means;

demodulating said corresponding electrical signal with said receiver electronics;

correcting burst errors arising from atmospheric scintillation with forward error correction block codes and deep interleaving both prior and subsequent to the demodulating step;

generating laser light with said laser transceiver at a power level to transmit wideband laser light site-to-site;

actively cooling said laser diode means with said thermoelectric cooler means;

modulating transmitted laser light with said electro-optical transmitter in accordance with data to be transmitted;

detecting said transmitted modulated laser light and generating an electrical signal corresponding thereto wideband data are received through the atmosphere by said electro-optical receiver and wideband data being outputted by said fiber-optic transmitter, and said laser light is generated by said diode means after being triggered by at least one inputted signal from said fiber-optic transmitter.

47. A method of operating a site-to-site atmospheric laser communication system for wideband data transmission, comprising the steps of:

providing a first transceiver having a fiber-optic transmitter and a fiber-optic receiver, a second transceiver having an electro-optical transmitter and an electro-optical receiver, a baffle assembly and thermoelectric cooler means, transmitter electronics, receiver electronics, a window element with a transparent resistive coating, a collimating lens in the optical axis of said laser light, a sighting scope, a position-sensing detector associated with said sighting scope, and steering means;

receiving light directly onto the second transceiver via said baffle assembly, without any intermediate field stop and re-imaging relay optics to reject off-axis light sources;

demodulating said corresponding electrical signal with said receiver electronics;

correcting burst errors arising from atmospheric scintillation with forward error correction block codes and deep interleaving both prior and subsequent to the demodulating step;

generating laser light with said laser transceiver at a power level to transmit wideband laser light site-to-site;

actively cooling said laser diode means with said thermoelectric cooler means;

modulating transmitted laser light with said electro-optical transmitter in accordance with data to be transmitted;

detecting said transmitted modulated laser light and generating an electrical signal corresponding thereto;

applying electrical current to said transparent resistive coating through which said modulated laser light travels so as to control the temperature of said window element;

moving said collimating lens longitudinally in said optical axis so as to adjust beam divergence and thereby achieve a desired range;

positioning said laser transmitter with said sighting scope;

generating a time-varying error signal with said a position-sensing detector;

deviating the direction of said modulated laser light with said steering means;

controlling said steering means with the control electronics in accordance with the time-varying position-sensing detector error signal so as to operate said laser transmitter in the presence of unstable mounting or platform motion; and correcting burst errors arising from atmospheric scintillation with forward error correction block codes and deep interleaving prior and subsequent to the modulating step, wideband data are received through the atmosphere by said electro-optical receiver and wideband data being outputted by said fiber-optic transmitter and said laser light is generated by said diode means after being triggered by at least one inputted signal from said fiber-optic transmitter.

* * * * *